United States Patent

[11] 3,543,925

[72] Inventor George B. Loughery 3rd
  Laureldale, Pennsylvania
[21] Appl. No. 745,312
[22] Filed July 16, 1968
[45] Patented Dec. 1, 1970
[73] Assignee Western Electric Company Incorporated
  New York, New York
  a corporation of New York

[54] ARTICLE SORTING DEVICE
  7 Claims, 4 Drawing Figs.
[52] U.S. Cl. .................................................. 209/74
[51] Int. Cl. .................................................. B07c 3/02
[50] Field of Search .......................................... 209/73, 74;
  214/11; 198/209

[56] References Cited
  UNITED STATES PATENTS
Re25,894 11/1965 McGrath ..................... 209/81

| | | | |
|---|---|---|---|
| 2,448,652 | 9/1948 | Aller ............................ | 209/73X |
| 3,176,840 | 4/1965 | Bickel ........................... | 209/74 |
| 3,322,273 | 5/1967 | Bailey............................ | 209/74 |

Primary Examiner—Richard A. Schacher
Attorneys—H. J. Winegar, R. P. Miller and J. L. Landis ABSTRACT: A distributor chute is moved rotatably about a vertical axis by a continuously energized drive mechanism and has an upper opening for receiving articles from a test fixture and a lower opening which is alined with one of a plurality of sorting bins arrayed peripherally about the circular path of motion of the lower end of the distributor. One of a plurality of interposers, radially disposed about the vertical axis, is actuated by a signal in accordance with the test characteristics of each article to engage a stop on the chute and interrupt the impartation of rotary movement from the drive mechanism to the chute to aline the chute with a selected bin.

ARTICLE SORTING DEVICE

BACKGROUND OF THE INVENTION

1. Field of the Invention

This invention relates to an article-sorting device and more particularly, to a rotary-sorting device coupled to a continuously energized drive and which is intermittently stopped to position the device in registration with a selected one of a plurality of sorting bins.

2. Technical Considerations and Prior Art

In the manufacture of various types of components, variations occur in the functional characteristics of individual components from different batch processes. It is believed that these variations may be due to small amounts of impurities, for example, in semiconductor material which produce notable differences in the operating characteristics of the components. Other variations occur as a result of deviations from other standards or specifications, for example, dimensions or other physical or metallurgical characteristics. Consequently, batches of purportedly identical components may be sorted into numerous groups of components in accordance with operational characteristics. This may include those components which are totally unacceptable.

In the past, various methods and apparatuses have been developed to sort components into any of a plurality of sorting bins selected in accordance with test characteristics. Of course, the components may be tested manually and then sorted. This procedure is of course very time consuming, expensive and not completely reliable.

A very basic type sorter may comprise a standard chute with a two position flap for the basic acceptable- nonacceptable sorting which has been made more sophisticated to include a multitude of flaps, each covering an entrance to a sorting bin. One of the flaps is actuated to divert the components into the selected bins.

Another sorter employs a moving belt or plate having a plurality of synchronized gates and some type of memory. The components are tested as they are conveyed along on the belt and are removed from the belt at any one of a plurality of positions in registration with one of the gates by a device actuated in accordance with a memory established in accordance with the test characteristics.

Another apparatus which has been devised to overcome the inherent difficulties in a manual sorting operation is one in which a distributing chute is rotated after the component has been tested by selectively engaging one of a plurality of cam members to rotate a shaft on which the chute is mounted to rotate the shaft to a particular orientation and position the chute over a selected bin. The distributing chute is actuated in response to an input signal from the test apparatus. Still another sorting apparatus uses a cardioid cam having a plurality of radial actuators, a selected one of which cooperates with the cam to aline a distributor chute with a selected bin.

More sophisticated sorting systems may include a stepping motor or a servosystem which is considerably more expensive than the systems priorly identified. But even with these more expensive systems, sorting speeds of only 10 to 50 milliseconds per position are attainable.

All of these commonly used apparatuses involve the repetitive acceleration of a distributing mass to successive ones of a plurality of positions. The mass is typically a shutter, trap, flap, door, chute, chute and motor armature, cam assembly or other device. In order to accelerate one of these devices in smaller amounts of time requires that the device have a low mass and that an adequate drive mechanism be connected to the device. Experience has shown that it is difficult to meet these criteria and simultaneously achieve a high degree of reliability.

It is an object of this invention to provide a new and improved apparatus including a low-mass distributing device for sorting sequentially and rapidly each of a mass of components in accordance with test characteristics.

Moreover, it is therefore an object of this invention to provide a new, improved rotary-sorting device which may be rapidly and accurately positioned in registration with any one of a plurality of radially disposed sorting bins.

SUMMARY OF THE INVENTION

With these and other objects in mind, the present invention contemplates an article-sorting device which includes a movably mounted distributor chute which is connected to a continuously energized drive and which is stopped intermittently and alined with a bin selected in accordance with test characteristics when one of a plurality of interposers disposed along a path of movement of the chute is actuated to engage a stop member on the chute.

More particularly, a distributor chute having an upper receiving opening and a lower discharge opening is mounted for rotation about a vertical axis. The lower opening is alined with any one of a plurality of sorting bins which are arrayed peripherally about a circular motion path of the lower end of the chute. A signal generated by the testing of the article currently under test actuates one of a plurality of radially disposed interposers to engage a stop member projecting radially from the chute and interrupt the motion of the chute which is connected to a continuously energized drive mechanism. The drive mechanism continues to supply driving torque during the time in which each of the selectively actuated interposers engages and holds the chute alined with one of the sorting bins; but the impartation of rotary motion by the drive mechanism to the chute is interrupted when the selected interposer engages the stop member and for the time required for the article to drop through the chute into the bin associated with the selected interposer. After the interposer has been moved radially out of engagement with the stop on the chute, the chute is rapidly accelerated by the torque supplied by the drive mechanism until the next interposer is actuated in accordance with the test characteristics of the next successive article.

DETAILED DESCRIPTION

Figure 1:
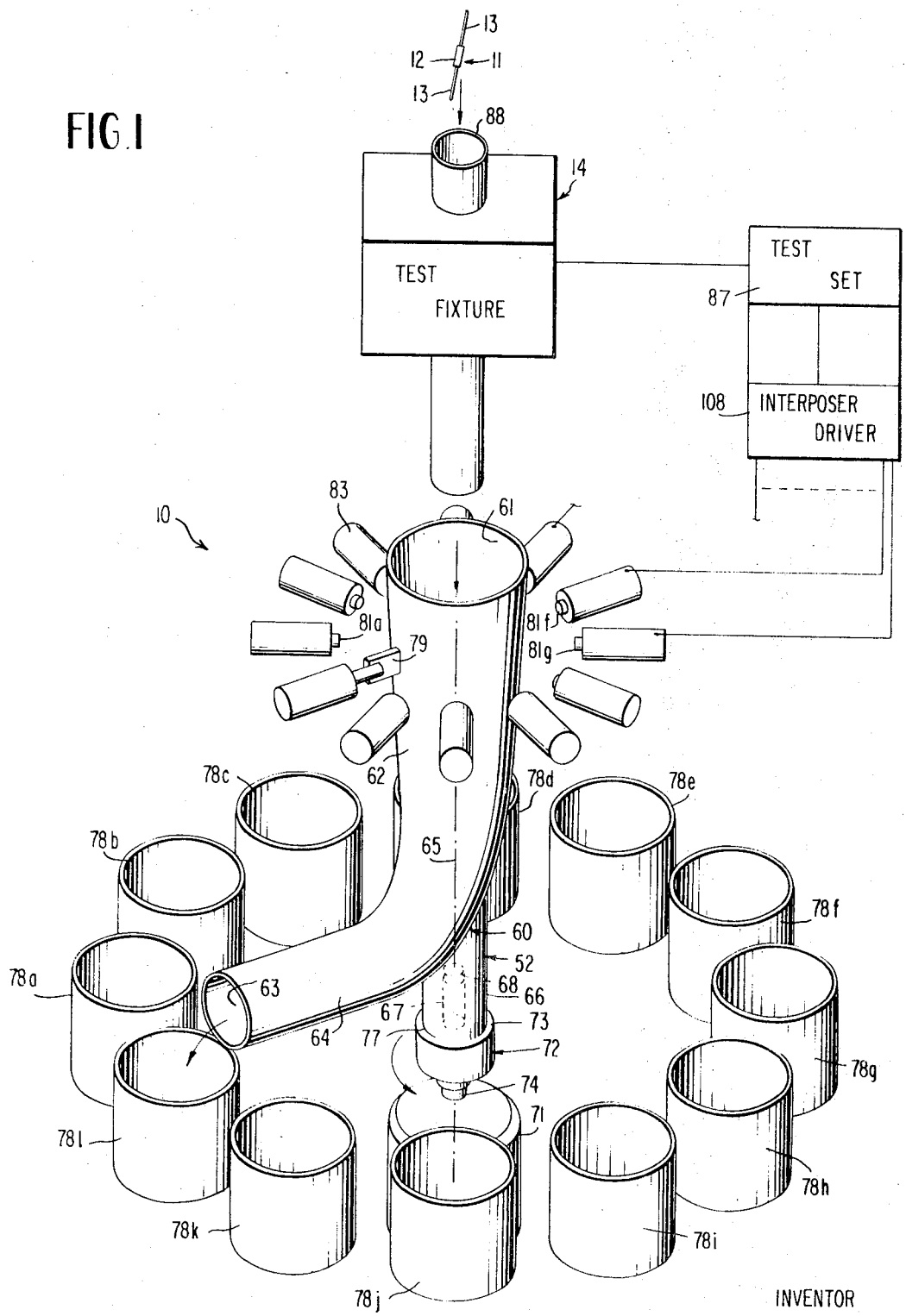
FIG. 1 is a perspective view of a sorting device embodying the principles of this invention and showing a distributing chute positioned under a test fixture for receiving articles and transferring articles to one of a plurality of sorting bins arrayed in a circular path about a lower end of the chute.

Referring now to FIG. 1, there is shown an overall perspective view of a sorting apparatus designated generally by the numerals 10. An article 11 to be tested and having, for example, a body portion 12 and a pair of axially disposed leads 13 is fed through a tube 88 into a test fixture, designated generally by the numerals 14, wherein a characteristic is determined by a test set, designated generally by the numerals 87. A signal is generated by the test set 87 in response to the test and is utilized in a control circuit 86 (see FIG. 4) to operate an interposer driver, designated generally by the numeral 108. The interposer driver 108 actuates a selected one of "n" 81 which are disposed radially about and spaced from a vertical axis 65. The tested article drops by gravity with a pneumatic assist, if required, from the test fixture 14 into a distributor chute 60 which is connected through a slip clutch 72 to a continuously operated drive mechanism 71. When the selected interposer 81 is actuated, the interposer engages a stop 79 projecting from the chute 60 to stop the chute when the chute is alined with a sorting bin 78 associated with the actuated interposer. The article 11 drops through the chute 60 to the sorting bin 78 whereafter the interposer 81 is moved out of engagement with the chute and the chute is accelerated rapidly toward a normal operating speed by the drive mechanism, before the next sorting position is selected in accordance with test characteristics of the next successive article 11.

Figure 2:
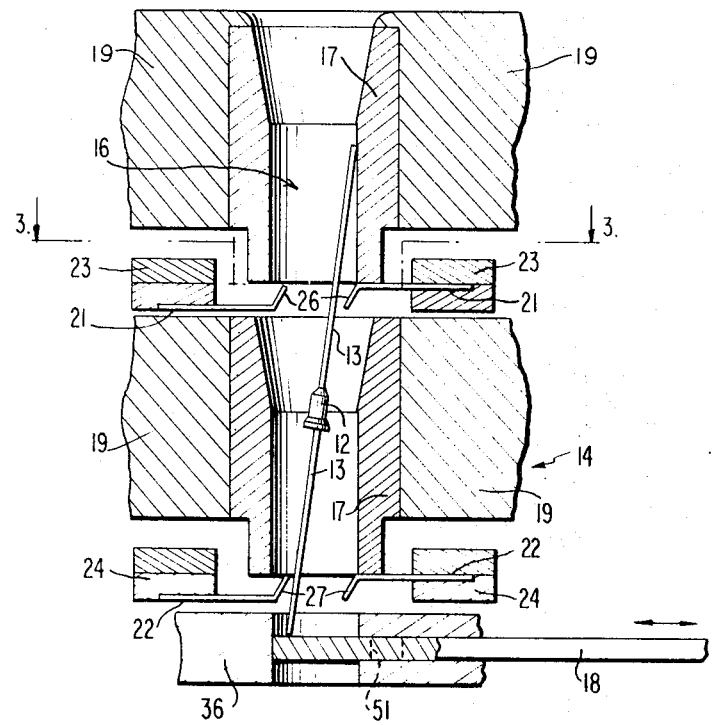
FIG. 2 is a detail view of the test fixture for testing articles and for then releasing the articles to drop by gravity into a distributor chute.

For a detailed description of an apparatus embodying the principles of the present invention, consider first the test fixture shown in FIG. 2 and designated generally by the numerals 14, which has a chamber 16 for receiving an article or component to be tested. This test fixture 14 is similar to that described in Western Electric Technical Digest No. 5 dated Jan. 1967, pages 13—14. The chamber 16 is defined on the sides by upper and lower spaced article-receiving sleeves 17–17 are fitted in spaced supporting blocks 19–19 and are tapered as shown to facilitate reception of the articles. As shown, the bore of the sleeves 17–17 is substantially oversize with respect to the articles 11 so as to permit reception of many sizes and shapes of articles.

The article 11 to be tested is engaged by two pairs of contact elements 21–21 and 22–22 are mounted which are comprised of flat leaf springs made of a conductive material. Each pair of contacts 21–21 and 22–22 are mounted for pivotal movement on arms 23 and 24, respectively, (see FIGS. 2 and 3) into engagement and out of engagement with the leads 13 of the component 11 currently in the chamber 16. The contact elements 21–21 and 22–22 are movable from an open position, shown in by the solid lines in FIG. 3, to a closed position, also shown in FIG. 3 by the broken lines. The free ends of the contact elements 21–21 and 22–22 are formed with a bent portion 26 and 27, respectively, to provide a wiping action upon closure on the leads 13, thus assuring positive electrical contact therewith. The arms 23 and 24 may be closed and opened by various mechanisms such as cams or solenoids.

Figure 3:
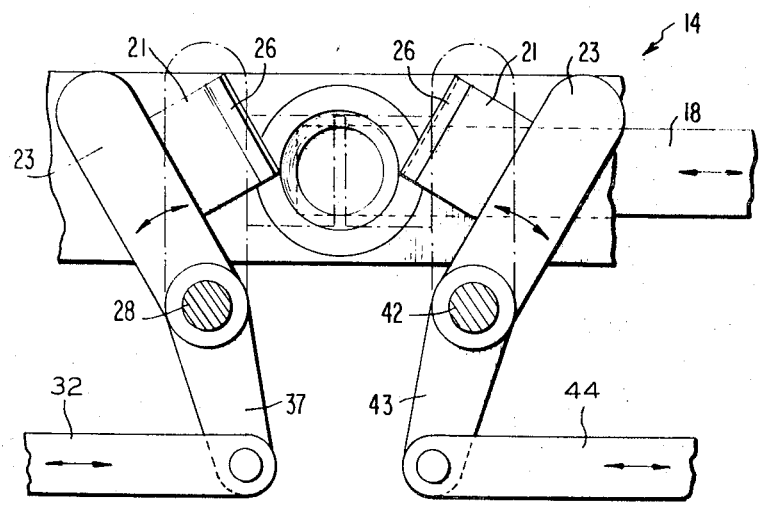
FIG. 3 is a plan view of the test fixture shown in FIG. 2.
Figure 4:
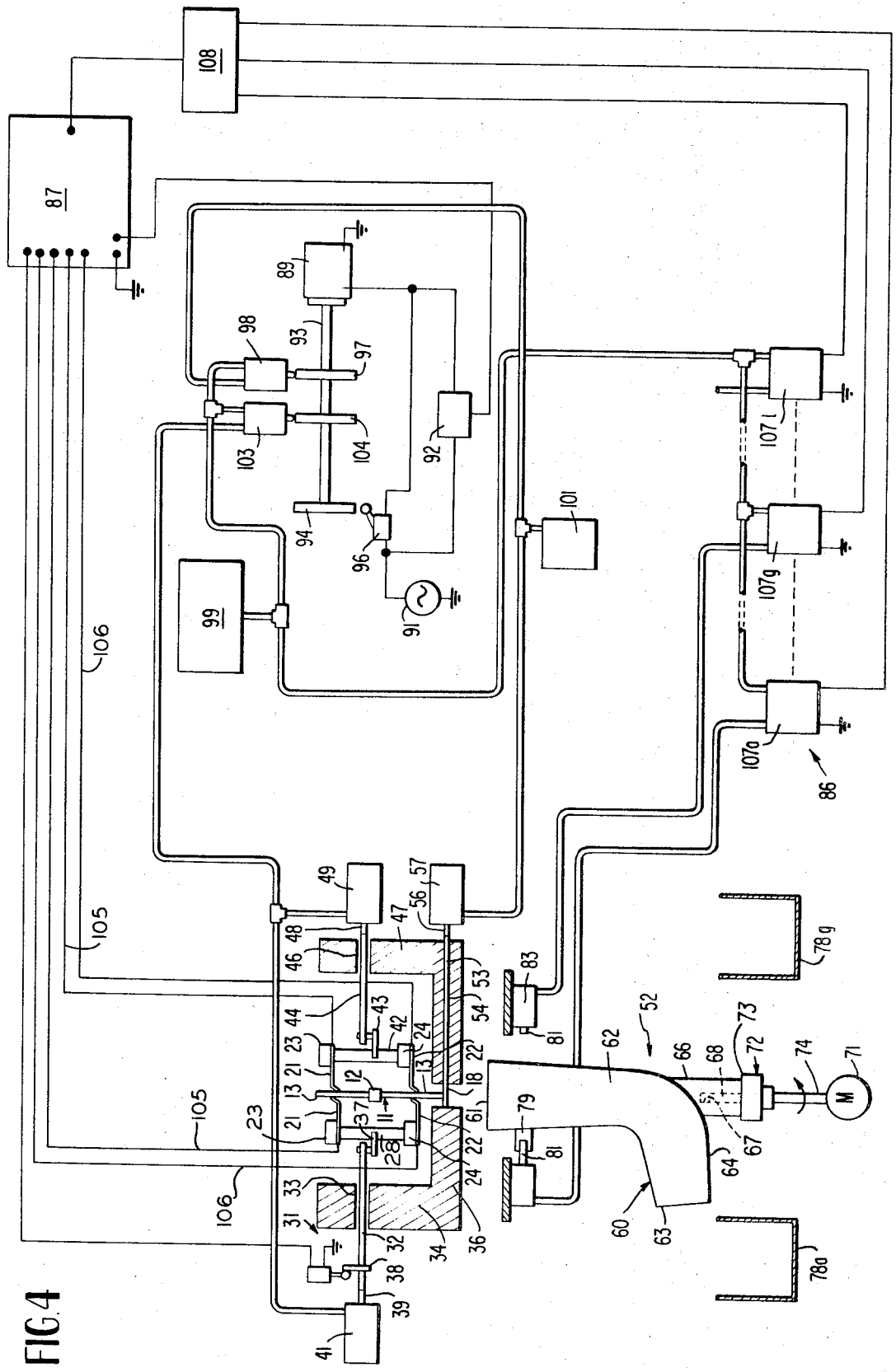
FIG. 4 is an elevational view, partially in section, and showing two of a plurality of interposers which are radially disposed about the distributor chute and connected to a control circuit for actuating a selected interposer in accordance with the test characteristics.

In one example, shown in FIGS. 3 and 4, one of the arms 23 and the subjacent arm 24 are mounted on a vertical shaft 28 for synchronous movement by a drive mechanism, designated generally by the numerals 31. The drive mechanism 31 comprises a rod 32 which is slidably mounted in a bore 33 in a support block 34. The support block is mounted on a base plate 36. One end of the rod 32 is attached to a bracket 37 which is secured to the shaft 28. The other end of the rod 32 is attached to a block 38 which is secured to a piston 39 of an air cylinder 41. Then, as the rod 32 is moved slidably within the bore 33, the bracket 37 is rotated to turn the shaft 28 and close the left-hand contact elements 21 and 22 as viewed in FIG. 4 on the leads 13.

Similarly, the other arm 23 and other subjacent arm 24 are mounted on a vertical shaft 42. A bracket 43 is secured to one end of the shaft and to one end of a rod 44 which is slidably mounted in a bore 46 on a support block 47. The other end of the rod 44 is fastened to a piston 48 of an air cylinder 49.

As can best be seen in FIG. 2, the upper contact elements 21–21 are positioned to move between the upper and lower sleeves 17–17, while the lower contact elements 22–22 move into a space just below the bottom of the lower sleeve 17 and above the shutter 18. As the upper contact elements 21–21 are closed, the upper contact elements grip an upper lead 13 of the component and the lower contact elements 22–22 engage and grip a lower lead 13. Moreover, as the contact elements 21–21 and 22–22 close, the contact elements alter the position of the component 11 and aline the component vertically in the center of the chamber 16 for testing.

The shutter 18 is retracted momentarily from a closed component-receiving and testing position, shown in FIG. 2, to an open, component-discharging position, near the end of each cycle to permit the tested component 11 to drop through an aperture 51 in the bottom of the shutter into a distributor device, designated generally by the numerals 52. The shutter 18 may be any of several well-known commercially available cam or solenoid-operated escapements. For example, as shown in FIG. 4, the shutter drive may comprise an elongated rod 53 which is slidably mounted in a bore 54 in the base 36 and which is moved within the bore by a piston 56 of an air cylinder 57.

The distributor device 52 comprises a distributor chute, designated generally by the numeral 60, which is positioned beneath the test fixture 14 to receive an article 11 tested and to deliver the article to a selected one of a plurality of the sorting bins 78a—78l (see FIG. 1). The distributor chute 60 has a receiving opening 61 in a vertical section 62 thereof for receiving articles from the test fixture 14, and a discharge opening 63 in a lower spout portion 64 thereof for discharging the articles in seriatim to selected ones of a plurality of bins 78 (see FIG. 1).

In order to support the distributor chute 60 for rotation about a vertical axis 65 which is coincident with the longitudinal axis of the vertical support section 62, a hollow shaft or post 66 is attached to the chute (see FIG. 1). The hollow shaft 66 has a bore 67 formed in a lower portion thereof and opening to the bottom surface of the shaft to receive a pin 68 axially projecting from a torsional coupling connected to a continuously energized motor 71. The pin 68 is in frictional engagement with the walls of the bore 67 in a hollow shaft 66.

The torsional coupling may be any of several well-known devices having a low mass on the output side, for example, a friction-type slip clutch device 72, such as that shown in FIG. 4. The slip clutch 72 has a disk 73 attached to a shaft 74 which extends from the continuously-energized motor 71.

In order to stop the distributor chute 60 so that the discharge opening 63 is alined with a bin 78 corresponding to the test characteristics, the distributor chute has a stop member or abutment 79 formed thereon and projecting laterally and radially therefrom (see FIG. 1). As the motor 71 turns the disk 73 and pin 68 to rotate the chute 60, the stop member 79 turns with the chute with the free end of the stop member having a circular path of movement. The stop member 79 is engaged by a selected one of a plurality of interposers 81a—81l which are disposed radially about the distributor chute 60. A selected one of the interposers 81 is actuated in response to a signal determined by a test characteristic and is moved radially toward the axis 65 of rotation and into the path of rotation of the stop member 79.

When the stop member 79 engages the selected one of the interposers 81, the rotation of vertical section 62 and spout 64 is interrupted through the slip clutch 72 as the motor 71 continues to rotate. The rotary motion of the distributor chute 60 is discontinued in an extremely short time so that the impulsive forces involved are of high amplitude. The amplitude of the force may be controlled by using a slight amount of resiliency either in the stop member or in the inner interposers. However, excessive resiliency may cause an objectionable bounce.

The employment of the slip clutch 72 greatly reduces, and may, under certain circumstances, eliminate any rebound of the chute after the stop member 79 is engaged by a selected one of the interposers 81. The weight of the chute 60 bearing against the top surface of the frictional slip clutch 72 generates a drag force against the lower portion of the chute as the chute clutch continues to rotate. The drag force tends to counteract any rebound forces and assists in arresting the chute opposite the selected one of the bins 78a—78l.

The arresting of the distributor chute 60 alines the discharge opening 63 of the chute with that one of the bins 78 which is associated with the actuated interposer 81 and which corresponds to the test characteristic for the article currently tested and received from the test fixture 14 into the distributor chute.

The disk 73 and the hollow shaft 66 are constructed from materials which are selected so ta that the slip clutch 72 transmits only that amount of torque from the continuously-operated motor 71 to the distributor chute 60 which is necessary to accelerate the relatively low mass chute to operating speed in an appropriately short amount of time, for example, within one-half a revolution. The rapidly rotating low mass chute 60 is stopped as it passes over a selected bin position. In this way, the sorting time is not unduly lengthened.

For those instances where the time required for testing the diodes 11 is high, the chute 60 may make many revolutions before the next successive interposer 81 is actuated. This condition requires a sorting time in milliseconds which is calculated by dividing 60,000 by the operational speed of the chute in revolutions per minute and then adding the quotient to a time Ts which is the time required from the completion of the test until the interposer 81 is energized. Using this mathematical relationship, it can easily be verified that the sum of these two times in milliseconds at a motor speed of 1,800 r.p.m. is approximately 40 milliseconds, with Ts typically having an order of magnitude of 5 to 10 milliseconds. The minimum time is approximately 10 milliseconds, while an average time for any random population of diodes 11 may be approximately 20—25 milliseconds.

Each of the interposers 81a—81l may be associated with a sorting bin 78a—78l which is diametrically opposed to the interposer. Alternately, the stop member 79 may extend from the chute 60 in a vertical plane coincident with the center lie line of the spout 64, (see FIGS. 1 and 4) or in a vertical plane at any angle to a vertical plane coincident with the longitudinal center line of the spout. In either embodiment "n" bins 78 and "n" interposers 81 may be used for sorting the tested articles 11 which are received successively from the test fixture 14.

As can best be seen in FIG. 1, each of the interposers 81 is driven by a piston from an air cylinder 83. The air cylinders 83 are selectively operated in accordance with the test characteristics of each of the articles 11.

Referring now to FIG. 4, there is shown control circuitry, designated generally by the numerals 86, which includes a test set 87 that receives signals from the contact elements 21 and 22 for each article 11 under test. The test set 87 may be any test set required to perform the required tests on the articles 11, which is capable of receiving signals and which utilizes the signals to effectuate the selective completion of output circuits to the interposers 81.

The electrical control circuitry 86 and associated pneumatic controls by which the actuation of the air cylinders is accomplished can best be understood when described in conjunction with the operation of the sorting apparatus 10.

OPERATION

Referring now to FIG. 4, when the test set 87 signals for an article 11 to be tested, a circuit is established to a motor 89 from a voltage source 91 through a relay w switch switch 92 which is closed momentarily by the test set (see FIG. 4). As the motor 89 starts turning, a cam shaft 93 is driven by the motor to rotate a cam 94, whereupon a switch 96 is actuated to maintain a closed circuit between the voltage source 91 and the electric motor 89 when the test set 87 opens the relay switch 92 by suitable impulses. Continued rotation of the cam shaft 93 turns a cam 97 to momentarily close a mechanical valve 98 which connects a solenoid valve 101 to a source 99 of compressed air. The solenoid valve 101 passes compressed air to the air cylinder 57 to move slidably the solid portion of the shutter plate 18 under the chamber 16 to support a next successive article 11 to be tested. Each successive one of the articles 11 is conveyed into the test fixture 14 through the tube 88 and is supported in the test fixture by the shutter plate 18 (see FIGS. 1 and 2).

When this condition is reached, a mechanical valve 103 is opened by a cam 104 on the shaft 93 to connect the source 99 of compressed air to air cylinders 41 and 49. The air cylinders 41 and 49 actuate the pistons 39 and 48, respectively, to move the rods 32 and 44 slidably within the bores 33 and 46. As the rods 32 and 44 are moved, the vertical shafts 28 and 42 are turned to rotate the contact elements 21 and 22 into engagement with the leads 13 of the article 11 in the chamber 16

While the contact elements 21 and 22 are in contact with the leads 13 of the article 11, a signal is transmitted through conductors 105 and 106 to the test set 87. The test set 87, in accordance with those test characteristics, conditions an interposer driver 108 which operates a selected one of a plurality of solenoid valves 107a—107l to actuate one of the interposers 81a—81l corresponding to the selected solenoid valve. Each of the solenoid valves 107 is associated with one of the interposers 81 which in turn is associated with a bin 78. In this way, each of the articles is sorted into a bin 78 in accordance with the test characteristics thereof.

After the selected interposer 81 has been actuated, the stop 79 on the chute 60 engages the interposer and interrupts the rotation of the chute 60. However, the motor 71, which is constantly energized, continues to rotate. The drag forces developed by the frictional engagement of the lower surface of the vertical section 62 of the distributor chute 60 against the upper, annular surface of the disk 73 of the slip clutch 72 tends to reduce or eliminate any rebound of the chute when the stop 79 engages the selected interposer 81.

Subsequently, the mechanical valve 103 is closed by the cam 104 to operate the air cylinders 41 and 49 to retract the rods 32 and 44 and move the contact elements 21 and 22 out of engagement with the leads 13 of the article 11. Also, the cam 97 actuates the valve 98 to operate the air cylinder 57 to move slidably the shutter plate 18 to permit the tested article 11 to drop into the receiving opening 61 of the distributor chute 60. At this time, the cam 94 opens the switch 96 to stop the motor 89 to place the circuit 86 in condition for the next cycle of operation.

After the article 11 has passed through the chute 60 into the selected one of the bins 78, the interposer driver 108 actuates the selected solenoid valve 107 to move retractably the interposer 81 out of engagement with the stop member 79. At that time, the slip clutch 72 is again rendered effective to overcome the drag forces developed by the chute supported on the slip clutch and to rapidly accelerate the chute 60 up toward the normal operating velocity of the motor 71.

An escapement device (not shown) may be employed and positioned above the test fixture 14 with suitable controls to ensure that the next successive article is not released from the chute 88 into the test fixture until the priorly tested article has been dropped into the distributor chute 60 and transferred to the appropriate sorting bin 78. Any of several commercially available prior art escapement devices such as that shown in U.S. Pat. No. 3,028,959, issued Apr. 10, 1962, may be used.

It should be readily apparent that while the specific embodiment shown in the accompanying drawings and described herein relate to an electrical measurement, for example, voltage breakdown, the test performed could be of any type. A physical measurement could just as well be made on each of the articles 11 with a signal generated in accordance with dimensions, for example, and interposers actuated by the test set 87 to sort the articles into the appropriate bins.

Moreover, it would be within the scope of this invention if a low inertia, high speed motor were substituted for the motor 71. The need for a slip clutch 72 is obviated and the motor shaft is received directly within the bore 67 in the hollow shaft 66 of the distributor chute 60. The engagement of a selected one of the interposers 81 with the stop member 79 overcomes the torque forces of the continuously energized motor to stall the motor, and the discharge opening 63 is positioned in registration with the appropriate bin 78. Then, when the selected interposer 81 is withdrawn from the path of motion of the stop member 79, the continuously energized motor again becomes effective and urges the chute 60 to rotate once again about the axis 65 until the next selected interposer is actuated.

I claim:

1. In a device for sorting articles, having a test characteristic determined by a test set, into bins arranged equidistantly from a center point:

a chute having an upper opening for receiving articles from said test set and an opening in a lower angularly projecting spout end of said chute for discharging said articles;

means including a slip clutch mounting said chute for rotation about a vertical axis extending through said upper opening and through the center point to position said lower end of said chute in registration with a selected one of said bins;

a stop alined with the spout end and extending laterally from said chute and having an annular path of motion;

a plurality of interposing members radially disposed about said chute and alined with individual bins;

means for moving the interposing members into said path of motion of said stop; and means for selectively operating said moving means to move a selected one of said interposing members to engage said stop in accordance with said test characteristic to position the lower end of the chute of over a selected alined bin.

2. In a device for sorting articles into bins:

test means for determining a test characteristic of each of said articles;

means rotatably mounted to move in a unidirectional path for transferring said articles from said test means to selected ones of said bins, said means including a spout;

a stop projecting from said movable mounted means;

a hollow shaft projecting from said sprout;

a drive motor;

a drive attached to said motor and including a disk, a pin axially projecting from said disk into said hollow shaft for coupling the motor to the shaft; and means responsive to each test characteristic for stopping the spout from further rotation by motion transmitted from the disk to the hollow shaft to aline the spout with a bin selected in accordance with said test characteristic.

3. In a device for selectively transferring articles from a test apparatus to one of a plurality of bins selected in accordance with a test characteristic:

means receiving said articles from said test apparatus for transferring said articles from said test apparatus to one of said bins;

means for rotatably mounting said receiving means to move in a unidirectional path;

continuously operated drive means for rotating said receiving means;

a stop member attached to said receiving means and extending radially therefrom;

a plurality of interposers radially disposed about said receiving means for engaging said stop member;

a normally effective slip clutch for coupling said drive means to said receiving means; and selectively operable means responsive to a test characteristic for moving one of said interposers into engagement with said stop member to render said slip clutch ineffective and position said receiving means over a selected one of said bins.

4. In a an apparatus for sorting articles from a test fixture:

a distributor chute having a receiving opening subjacent said test fixture and a discharge opening in a lower end of said chute spaced from said receiving opening;

means mounting said distributor chute for rotation in a unidirectional path about a vertical axis passing through a center of said receiving opening;

a plurality of sorting bins arrayed peripherally about a circular path of motion of said lower end of said chute;

a stop member attached to and extending from said chute;

a plurality of interposers disposed concentrically about said chute and slidably mounted for radial movement into position to be engaged by said stop member;

means for testing said article in said test fixture and for selectively actuating one of said interposers to move said interposer radially into said path of motion of said stop member;

continuously operated drive means; and a frictional coupler exerting drag forces on said mounting means to counteract a rebound force of said stop member against said interposer and rendered effective when said interposer is retracted for operably connected said drive means to said chute.

5. In an apparatus for sorting articles in accordance with characteristics determined by a test facility:

a chute having an angularly extending spout;

a post projecting from the juncture of said chute and said spout and along the axis of the chute said post having an axial bore;

a friction coupler having a disk supporting said post and a pin extending into said bore for frictionally engaging the wall of the bore to insure that said post, said chute and said spout rotates about a vertical axis;

a stop laterally projecting from said chute;

means for rotating said coupler to frictionally rotate said post, said chute, said chute, said spot spout and said stop;

a plurality of interposers positioned about said chute and mounted for movement into the path of movement of said stop; and means responsive to said test facility ascertaining a characteristic of an article for moving a selected interposer into the path of said stop to interrupt the frictional rotation of said post by said frictional coupler to stop said chute and said spout.

6. In a device for sorting articles in accordance with predetermined characteristics:

a chute having an angularly extending spot spout;

means for mounting said chute for rotation about a longitudinal axis passing through the chute, said mounting means including a friction clutch;

a stop projecting from the chute and having a rotary path of movement;

a plurality of interposers arrayed about the path of movement of the stop;

a plurality of means for operating the associated interposers to move the interposers into the path of movement of said stop;

means for imparting rotary motion to said chute through said friction clutch;

test means for generating signals in accordance with the predetermined characteristics of each article;

means for advancing articles to the test means and then to the chute; and means responsive to each generated signal for selectively actuating one of said interposer-operating means to move an associated interposer to engage said rotating stop and interrupt the impartation of rotary motion through said friction clutch to said chute.

7. A device for receiving and distributing into a circular array of bins tested articles according to their tested a characteristics, comprising:

a torsional coupling having:
1. a pin; and
2. a frictional-type slip clutch including a disk mounting said pin in a mutual direction;

means for continuously rotating said slip clutch of said torsional coupling in a unidirectional circular path;

a hollow shaft having a bore at one end to receive said pin for axially alining said shaft with said slip clutch;

means mounted on said hollow shaft for receiving and distributing the tested articles into the bins according to their tested characteristics; and means responsive to the tested characteristics for interrupting transmission of said unidirectional circular motion through said slip clutch to stop said distributing means in registration with a selected one of the bins.